(12) United States Patent
Wyatt

(10) Patent No.: US 9,184,533 B2
(45) Date of Patent: Nov. 10, 2015

(54) OFFSHORE ELECTRICAL PLANT INSTALLATION METHOD AND SYSTEM

(71) Applicant: Robert Wyatt, Ulverston (GB)

(72) Inventor: Robert Wyatt, Ulverston (GB)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/349,841

(22) PCT Filed: Oct. 3, 2012

(86) PCT No.: PCT/GB2012/052442
§ 371 (c)(1),
(2) Date: Apr. 4, 2014

(87) PCT Pub. No.: WO2013/050755
PCT Pub. Date: Apr. 11, 2013

(65) Prior Publication Data
US 2014/0246232 A1 Sep. 4, 2014

Related U.S. Application Data

(60) Provisional application No. 61/542,955, filed on Oct. 4, 2011.

(30) Foreign Application Priority Data

Oct. 4, 2011 (GB) .................................. 1117069.3

(51) Int. Cl.
*F03D 11/00* (2006.01)
*H01R 13/52* (2006.01)
(Continued)

(52) U.S. Cl.
CPC ............ *H01R 13/5221* (2013.01); *H01R 43/26* (2013.01); *H02G 1/10* (2013.01); *Y10T 29/49002* (2015.01)

(58) Field of Classification Search
CPC .. H01R 13/5221; H01R 13/58; H01R 13/633; H01R 13/523; H01R 13/6278; H01R 43/26; H02G 1/10; H02G 9/00; H02G 9/02; H02G 9/025; A61B 18/203; H05B 41/34; G01V 1/201; B63B 21/50; B63B 35/44; E02D 27/42; F03D 1/001; F03D 1/005; F03D 11/04
USPC ......... 174/75 D; 415/115, 116; 439/191, 271, 439/730; 29/529.1; 405/154.1, 169, 158; 416/197, 196; 60/641.12; 290/53, 54
See application file for complete search history.

(56) References Cited

U.S. PATENT DOCUMENTS 6,425,708 B1 * 7/2002 Siegfriedsen .............. 405/154.1
7,837,518 B2 * 11/2010 Nicholson ..................... 439/730
(Continued)

FOREIGN PATENT DOCUMENTS

EP  2209175  7/2010
EP  2302204  3/2011
(Continued)

OTHER PUBLICATIONS

International Preliminary Report on Patentability cited in PCT/GB2012/052442, mailed Dec. 16, 2013.
(Continued)

*Primary Examiner* — Timothy Thompson
*Assistant Examiner* — Guillermo Egoavil
(74) *Attorney, Agent, or Firm* — Lempia Summerfield Katz LLC

(57) ABSTRACT

A method for electrically connecting an offshore first electrical plant to a second electrical plant, the offshore first electrical plant being an offshore wind turbine generator, the method comprising providing a transition cable terminated at one end with a first connector part, the transition cable being connected or connectable at the other end to the offshore wind turbine generator above the water surface, and providing a cable terminated at one end with a second connector part and connected or connectable at the other end to the second electrical plant, the second connector part being adapted to mate with the first connector part to form a connector.

22 Claims, 8 Drawing Sheets

(51) Int. Cl.
*H02G 1/10* (2006.01)
*H01R 43/26* (2006.01)

(56) References Cited

U.S. PATENT DOCUMENTS

| | | | |
|---|---|---|---|
| 8,118,538 B2* | 2/2012 | Pao | 415/115 |
| 2011/0140420 A1* | 6/2011 | Loh et al. | 290/44 |
| 2012/0280506 A1* | 11/2012 | Ives et al. | 290/53 |

FOREIGN PATENT DOCUMENTS

| | | |
|---|---|---|
| GB | 2423778 | 9/2006 |
| GB | 2431702 | 5/2007 |
| GB | 2444873 | 6/2008 |
| WO | WO0039903 | 7/2000 |
| WO | WO2008139190 | 11/2008 |
| WO | WO2009036107 | 3/2009 |

OTHER PUBLICATIONS

International Search Report and Written Opinion cited in PCT/GB2012/052442, mailed Aug. 2, 2013.

Search and Examination Report cited in GB1217693.9, mailed Jan. 31, 2013.

* cited by examiner

OFFSHORE ELECTRICAL PLANT INSTALLATION METHOD AND SYSTEM

This application is the Natioanl Stage of International Application No. PCT/GB2012/052442, filed Oct. 3, 2012, which claims the benefit of U.S. Provisional Patent Application No. 61/542,955, filed Oct. 4, 2011 and Great Britain Patent Application No. 1117069.3, filed on Oct. 4, 2011. The entire contents of these documents are hereby incorporated herein by reference.

BACKGROUND

The present embodiments relate to methods and systems for connecting an offshore first electrical plant, which is a wind turbine generator, to a second electrical plant. The present embodiments also relate to electrical connectors for connecting a cable to an offshore electrical plant such as a wind turbine generator.

It is known to provide offshore wind farms including multiple wind turbine generators. A typical farm will include multiple renewable wind turbine generators connected in a daisy chain manner, by inter-array cables, to an electrical sub-station, where the generated power is collected, processed, and fed back to a station onshore. The power is generated at low voltage and stepped up for transmission back to the sub-station, which may either be onshore or offshore.

Typically, each wind turbine generator has two cables, one into the generator and one out, which allows the wind farm to be connected up in the daisy chain arrangement and allows the wind turbine generator at the end of the chain to be connected to the sub-station. The cables between the energy generators and also the cable between one of the energy generators and the sub-station are known as inter-array cables or infield cables.

A known method for installing a wind farm involves installing the wind turbine generator support structures, typically about 1 km apart and laying inter-array cables between the support structures. The inter-array cables are laid, and a plough is used to create a furrow in which the inter-array cable sits and is covered over (e.g., buried in the seabed).

The generator support structures are provided with a feature to allow the end of an inter-array cable to be pulled from the seabed to a part of the structure that is above the water line. This feature may be in the form of a tube, either internal or external to the support structure that the cable may be pulled through. Alternatively, this feature may be an aperture in the support structure that allows the cable to be pulled up through the support structure itself. Typically these features have a mouth at the bottom end, near the sea bed, for receiving the end of an inter-array cable and a bend to direct the cable round to the vertical and allow the cable to extend upwardly to above the surface. Due to the typical shape of this feature, it is commonly known as a 'J-tube'. However, other shapes and types of feature are also used, which are also generically referred to as the "J-tube" (e.g., a feature that allows the cable to be pulled from the seabed up through the structure is generically termed a "J-tube"), whatever its specific design.

When it is desired to connect the inter-array cable to the wind turbine generator, a lifting wire is passed downwardly from the structure above the surface through the J-tube to a bottom end. Alternatively, the lifting wire may have been pre-installed in the J-tube onshore. The lifting wire is attached to the end of the inter-array cable and is then winched up the J-tube, thereby pulling the inter-array cable through the J-tube for connection to the wind turbine generator. The attachment of the lifting wire to the inter-array cable on the seabed is carried out by underwater operatives or remotely operated vehicles (ROVs).

Once the inter-array cable has been winched up through the J-tube, steel armor wires in the cable are clamped or terminated to the structure, thus mechanically anchoring the cable to the structure. Rocks are placed around the bottom of the support structure to provide scour protection to protect the inter-array cable and to prevent the support structure being eroded by eddy currents.

Another team of operatives on the tower connects the internal parts (e.g., copper wire and fiber optics) of the inter-array cable to the renewable energy generator.

SUMMARY AND DESCRIPTION

The known method described above poses a number of problems. This process is time consuming, awkward, difficult, and expensive. The known method requires personnel and equipment to have access and egress from the structure, which may only be done in good weather and a calm sea state. Damage to the cable may occur during the cable pulling process. The installation process uses underwater support divers and ROVs to connect the lifting wire to the inter-array cable and to help feed the cable into the J-tube as it is winched in. Once the cable is installed, another team of operatives is required on the tower to connect the inter-array cable to the wind turbine generator.

A lot of the installation process is executed offshore and is therefore subject to the weather conditions experienced at sea, which may be relatively severe in areas where offshore wind farms are typically set up. There may also only be a limited season in which weather conditions are suitable for installation. As a result, the installation time may be unpredictable, and installation may be delayed for long periods of time, making the whole installation procedure longer and more costly.

The above-described method also uses boats and ROVs to operate close to the generator support structures, which may potentially cause damage if the boats and ROVs collide with the support structures. Further, there is a health and safety risk involved in transferring personnel onto and off the structure.

Viewed from a first aspect, one or more of the present embodiments provide a method for electrically connecting an offshore first electrical plant to a second electrical plant. The offshore first electrical plant is an offshore wind turbine generator. The method includes providing a transition cable terminated at one end with a first connector part. The transition cable is connected or connectable at the other end to the offshore wind turbine generator above the water surface. The method also includes providing a cable terminated at one end with a second connector part and connected or connectable at the other end to the second electrical plan. The second connector part is adapted to mate with the first connector part to form a connector.

Viewed from a second aspect, one or more of the present embodiments provide a system for electrically connecting an offshore first electrical plant to a second electrical plant. The first electrical plant is an offshore wind turbine generator. The system includes a transition cable terminated at one end with a first connector part. The transition cable is connected or connectable at the other to the offshore wind turbine generator. The system also includes a cable terminated at one end with a second connector part and connected or connectable at the other end to the second electrical plant. The second connector part is adapted to mate with the first connector part to form a connector.

As recited above, the offshore first electrical plant is an offshore wind turbine generator. The second electrical plant may, but not exclusively, be another offshore wind turbine generator, an offshore electrical sub-station, or an onshore electrical sub-station. In the case in which the second electrical plant is a sub-station, the second electrical plant is a substation that processes power produced by at least one wind turbine generator.

The transition cable may be connected or connectable directly to the offshore wind turbine generator. Alternatively, transition cable may be connected or connectable to a switchgear that may or may not be in or on the offshore wind turbine generator. For example, the switchgear may be located on a transition piece (e.g., upon which the offshore wind turbine generator may be located) and connected to the offshore wind turbine generator by further cabling and/or connectors.

The cable that is terminated at one end with a second connector part may be connected or connectable directly to the second electrical plant. Alternatively, the cable may be connected or connectable to a switchgear that may or may not be in or on the second electrical plant. For example, the switchgear may be on a transition piece (e.g., upon which the second electrical plant may be located) and connected to the second electrical plant by further cabling and/or connectors.

By providing a transition cable terminated with a first connector part, a connection may be made with a cable, via a second connector part, at a distance from the offshore wind turbine generator. This may reduce the risk of damage to the offshore wind turbine generator or the support structure of the offshore wind turbine generator due to collision with ships or remotely operated vessels.

During installation, it is not necessary to winch a cable up through a J-tube, thereby avoiding the time and manpower required for this process. If the system includes a J-tube, the transition cable may be preinstalled in the J-tube onshore so that the cable pulling process does not have to be performed offshore where it is more difficult and awkward to execute. Winching a cable up through a J-tube offshore is not desirable. The winching requires a number of operatives to aid the operation and may lead to damage of the cable. A large percentage of the problems encountered and insurance claims made during installation of an offshore wind farm are due to cable damage during this pulling process. Typically, with the above described known method, it takes about 1 day to lay and install one inter-array cable (e.g., pulling the inter-array cable up through a J-tube at each end), and thus, installing a whole farm may take a significant amount of time.

Additionally, the connection between the transition cable and the cable is achieved using two mateable connector parts and mitigates the need for splicing and connecting of the two cables offshore. This also reduces the amount of time and manpower required for operations offshore.

By facilitating and reducing the amount of offshore operations, there may be a reduced dependence of the operations on the weather conditions. This reduces cost and the possibility of delays, while increasing safety. Using a transition cable provides that the connection may be made a distance from an offshore wind turbine generator support structure, and therefore, damage to the support structure, due to collision with vessels or ROVs, is less likely.

An offshore wind farm including a plurality of offshore wind turbine generators and optionally an electrical sub-station may be provided. By linking the wind turbine generators, and one or more sub-stations if provided, using mated first and second connector parts in accordance with the first and second aspects of the present embodiments, installation time spent offshore when installing plural offshore wind turbine generators is expected to be reduced compared to the traditional known methods.

One or more of the present embodiments provide a method and a system for connecting two offshore wind turbine generators or for connecting an offshore wind turbine generator to a sub-station. The sub-station may be onshore or offshore. An "offshore wind turbine generator" and a "sub-station" are referred herein as electrical plants. The first and second connector parts form a connector.

The connection may be made by a direct connection, using a connector, between two transition cables, one of which is connected or connectable to an offshore first electrical plant (e.g., the offshore wind turbine generator) and the other of which is connected or connectable to a second electrical plant (e.g., another offshore wind turbine generator or a sub-station). With such an arrangement, there may be one connector between a pair of electrical plants (e.g., the pair of electrical plants including a wind turbine generator and a sub-station, or two wind turbine generators), and the connector may be located at any point between the two electrical plants.

This arrangement has the advantage of using only one connector between two electrical plants. The arrangement may therefore provide an economical connecting solution. In this case, the two transition cables are of sufficient length to span the distance between the electrical plants.

Alternatively, the connection may be made by connecting a transition cable, connected at one end to an offshore wind turbine generator, to an inter-array cable at the other end. The inter-array cable may be connected at the other end to a second electrical plant (e.g., another offshore wind turbine generator or an electrical sub-station; via another transition cable). This arrangement has the advantage that the transition cable or cables may have a relatively short length, because the distance between the electrical plants may be spanned at least partly by the inter-array cable. In certain embodiments, a connection may be made by connecting a transition cable to each end of an inter-array cable, by respective connectors. The inter-array cable extends at least some of the distance between the two electrical plants (e.g., there may be two connectors between a pair of electrical plants (the pair of electrical plants including an offshore wind turbine generator and a sub-station, or two wind turbine generators)).

In some embodiments, in which the second connector part terminates an inter-array cable, the method may include providing the inter-array cable, at an end remote from the first-mentioned connector, with another second connector part. The method may also include providing another transition cable. The other transition cable is connected or connectable to the second electrical plant and is terminated with a first connector part adapted to mate with the second connector part at the remote end of the inter-array cable to form a second connector.

The support structure for the wind turbine generator may be a floating support structure that may be tethered or anchored to the sea bed, or the structure may be a foundation sitting on or protruding into the sea bed. In one embodiment, the support structure is a foundation sitting on or protruding onto the sea bed. In one embodiment, the support structure holds the wind turbine generator above the water surface. A transition piece may be provided on the support structure upon which the turbine is located. The turbine, the foundation, and the transition piece, if provided, may all be a single unit that, for example, may be integrally formed.

The transition cable may be installed on a structure that supports the offshore wind turbine generator and may extend from the end that is connected or connectable to the offshore wind turbine generator located above the surface towards the bottom of the sea. From there, the transition cable may extend to a sub-sea location at a distance from the offshore wind turbine generator, ready for connection with another transition cable or an inter-array cable, via the first and second connector parts respectively. In one embodiment, the transition cable extends from the end that is connected or connectable to the offshore wind turbine generator, located on the support structure above the surface of the sea, towards the bottom of the sea and back up to above the surface to locate the first connector part above the surface. The transition cable may be held, for example, by being attached to or supported by the support structure for the wind turbine generator, to be available to be collected for connection to the second connector part on the deck of a vessel.

The first connector part does not have to be located on the sea bed for sub-sea mating with the second connector, nor, in the case of a dry-mate connection with the second connector part, retrieved from the sea bed and lifted to the surface. This may save time during installation. Additionally, less protection is required if the first unmated connector part is not placed on the sea bed. The first connector part may be supported by the structure at the surface. When it is desired to connect the first and second connector parts, the first connector part may be detached from the structure and moved away from the structure (e.g., using floats or a boat). The first connector part may be moved to a position away from the structure where the first connector part is mated with the second connector part.

The mating may be effected sub-sea (e.g., wet-mating). In one embodiment, the mating is effected above the surface of the sea (e.g., dry-mating) on the deck of a vessel. After mating, the first and second connector parts may be lowered to the bottom of the sea (e.g., the sea bed).

If the cable terminated with the second connector part has been deployed and is located on the sea bed, the method may include lifting the second connector part from the bottom of the sea to the surface, and mating the second connector part with the first connector part above the surface. This provides that the connection may be made easily on the deck of a ship for example, and does not require underwater operatives or ROVs. Alternatively, the cable terminated with the second connector part may not be pre-deployed on the sea bed. Rather, the second connector part on the end of the cable may be mated with the first connector part before the cable is deployed sub sea. In this case, there is no step of retrieving the second connector part from the sea bed, which may reduce installation times.

In the embodiments mentioned above in which a pair of electrical plants are connected by a first transition cable, a first connector, an inter-array cable, a second connector, and a second transition cable, the inter-array cable may be deployed on the sea bed with opposite ends terminated with the respective second connector parts of the first and second connectors. The method may include lifting the second connector parts to the surface for mating. Alternatively, the inter-array cable may be connected to the first transition cable via the first connector, followed by laying of the cable and then connection to the second transition cable via the second connector. Thus, the connections at each end of the inter-array cable may be made at the surface and at the start and finish of the cable laying process.

The first and second connector parts of the connector or each connector are adapted to mate with each other. In one embodiment, each connector part has at least one electrical contact, and when the connector parts are mated, the electrical contacts are engaged with each other to make an electrical connection. The action of bringing together the connector parts may cause the engagement of the electrical contacts. In certain embodiments, the electrical contacts of a connector include a pin and socket, whereby an electrical connection is made by engagement of the pin in the socket.

The connector may be made using dry mate connector parts. In one embodiment, the first and second connector parts are dry mateable.

The transition cable may be provided pre-installed at the end connectable to the offshore wind turbine generator with a switchgear, junction box, or connection system for connection to the wind turbine generator. Similarly, the second cable terminated at one end with the second connector part may be provided pre-installed at the end connectable to the second electrical plant with a switchgear, junction box, or connection system for connection to the wind turbine generator.

In each case the switchgear, junction box or connection system may be provided on the electrical plant, hard wired thereto or connected by pre-installed connectors. Alternatively, the switchgear, junction box, or connection system may be positioned remotely from the electrical plant, for example, on a transition piece upon which the electrical plant is supported, and connected by cabling and/or connectors.

Irrespective of whether it is directly on the electrical plant or located remotely therefrom, the switchgear, junction box, or connection system may be hard wired to the electrical plant or connected/connectable via pre installed connector parts. Further, the transition cable or the cable terminated at one end with a second connector part may be hard wired to the switchgear, junction box, or connection system or connected/connectable thereto via preinstalled connector parts.

In some embodiments, the end of the transition cable connectable to the offshore wind turbine generator is provided with a connector part for connection to another connector part provided on, or connected or connectable to, the offshore wind turbine generator. Similarly, the cable that is terminated at one end with the second connector part (e.g., a second transition cable) may be provided at the other end with a connector part for connection to another connector part provided on, or connected or connectable to, the second electrical plant. There is then no need for splicing the respective cable offshore to connect to the wind turbine generator or the second electrical plant. Thus, the connection system may involve the simple mating of two connector parts in the offshore environment. This may save time in the field and make the connection process safer and more reliable.

In the embodiments in which the connection system to the offshore wind turbine generator and/or to the second electrical plant involves the use of connector parts, there may be just one pair of mateable connector parts, or there may be a plurality of pairs. Thus the method may include providing the transition cable with a plurality of connector parts for connection to a plurality of connector parts that are connected or connectable to the offshore wind turbine generator. For example, a cable with plural conductive cores, such as three high voltage cable cores in the case of three phase power transmission, may be provided with an individual connector part for each high voltage conductive core, with a corresponding number of mating connector parts being provided on the offshore wind turbine generator, the second electrical plant, or a switchgear of the electrical plants. Each pair of mateable connector parts would form a respective connector. Such connectors would be smaller and easier to handle than a single connector for a plurality of cable cores.

In one embodiment, when the second connector part terminates an inter-array cable, the inter-array cable is provided with another connector part at the other end for connection to another transition cable leading to the second electrical plant.

This allows a whole renewable energy farm to be connected using preterminated inter-array cables that would decrease the time for installation and the time spent on operations offshore when installing multiple offshore wind turbine generators.

The first and second connector parts may be terminated to the cables offshore on the deck of a ship. In one embodiment, the first connector part may be connected to the transition cable onshore, and the second connector part may be connected to the cable onshore. Connector parts at the other ends of the transition cables and connector parts on the electrical plants may also be installed onshore. This reduces the amount of time spent on operations offshore and the number of offshore operatives required, thus reducing installation costs and the possibility of delays.

One or more of the present embodiments extend to the system, as described above, before the first and second connector parts are mated, and to the system after the parts have been mated.

Viewed from a third aspect, one or more of the present embodiments provide a system electrically connecting an offshore first electrical plant to a second electrical plant. The offshore first electrical plant is an offshore wind turbine generator. The system includes a transition cable terminated at one end with a first connector part. The transition cable is connected at the other end to the offshore wind turbine generator, and a cable is terminated at one end with a second connector part and connected at the other end to the second electrical plant. The second connector part is mated with the first connector part to form a connector.

The connector may be located under water (e.g., on the sea bed).

Considering the method and system of the present embodiments, a connector that is strong, durable, and watertight whilst being cost effective and relatively easy to manufacture may be provided.

Viewed from a fourth aspect, a connector for use underwater and for connecting an underwater cable to an offshore electrical plant is provided. The connector includes a first connector part and a second connector part. Each connector part includes at least one electrical contact and a connector part housing having a front portion for engagement with the other connector part housing. The connector also includes at least one longitudinally extending member located radially outwardly of the connector part housings, a first armor termination member located longitudinally rearwardly of the front portion of the first connector part, and a second armor termination member located longitudinally rearwardly of the front portion of the second connector part. When the first and second connector parts are mated, the at least one electrical contact of the first and second part comes into electrical contact with a respective at least one electrical contact of the other connector part to form an electrical connection. When the first and second connector parts are mated, the two connector part housings come into contact to provide a watertight seal around the electrical connection to isolate the electrical connection from the ambient environment of the connector. When the connector is assembled, the at least one longitudinally extending member extends between the first and second armor termination members.

In such an arrangement the at least one longitudinally extending member extending between the first and second armor termination provides mechanical strength and mechanical continuity between the two connected cables. The two connector part housings that create a watertight seal (e.g., by use of an elastomeric or rubber seal) around the electrical connection isolate the electrical connection from the ambient environment of the connector. Thus, the component providing mechanical strength is distinct from the component providing isolation of the electrical connection from the ambient environment. This provides that the choice of material used for the components of each of these two separate functions may be optimized for their purpose, giving several advantages including strength, weight, corrosion resistance and cost.

For example, the connector part housings and/or the seal do not have to be designed to withstand mechanical stresses that may be applied to the connector during installation and in use, such as torsional or longitudinal stresses. Rather, these stresses may be borne by the at least one longitudinally extending member.

It is not necessary to provide a sealed enclosure externally of the mated first and second connector parts, because the first and second connector parts provide a watertight seal. The outside of the mateable first and second connector parts may thus be exposed to ambient conditions.

The internal components of the connector parts for establishing one or more connector parts may be known land based connector parts, as supplied for example by Pfisterer Ltd., UK or Nexans Euromold, Belgium. In one embodiment, such internal components are in a watertight housing, formed from the connector part housings, which are sealed together, for example, with a rubber seal.

The underwater connector may be adapted for electrical power transmission. It may be adapted to handle alternating root mean square (RMS) voltages up to 5, 10, 20, 30, 40, 50, 60 or 70 kV. In one embodiment, the connector is adapted to handle high alternating RMS voltages such as 10 kV or higher (e.g., 33 kV).

The underwater connector may be adapted for optical transmission, for example, via optical fibers. The cable may contain optical fibers and/or electrical conductors. The underwater connector may be a hybrid connector with optical fibers and electrical conductors. The connector may also optionally contain three high voltage conductor cores, a low voltage contact, such as a triad contact, an earth pin and/or a fiber optic contact.

In one embodiment, the watertight seal is isolated from strain of the at least one longitudinally extending member. Stresses in the cable (or cables) that may cause strain in the at least one longitudinally extending member are not transferred to the watertight seal. This helps maintain the integrity of the watertight seal. Additionally, as the watertight seal is subject to less stress and strain the two housing parts may be safely manufactured to a lower specification, therefore allowing the housing to be made from a cheaper corrosion resistant material.

In one embodiment, in the assembled connector, the at least one longitudinally extending member is movable relative to the front portions of the connector part housings of the first and second connectors. This may provide that strains in the longitudinally extending member, caused, for example, by loads applied to the first and/or second armor termination member, are not transmitted to the connector part front portions when the connector part from portions are in the engaged condition making the electrical connection and the watertight seal protecting that connection. In one embodiment, in the assembled connector, the at least one longitudinally extending member is longitudinally movable relative to the front portions of the connector part housings of the first and second connectors. In certain embodiments, the longitudinally extending member may be movable in any direction relative to the front portions.

In one embodiment, the at least one longitudinally extending member, once installed, is rigidly connected to the armor termination members. This provides that there is no relative movement between the two armor termination members and the at least one longitudinally extending member so that the at least one longitudinally extending member may transmit movements and mechanical stresses and strains effectively between two cables to which the armor termination members are attached.

The connector may include an adjustment device that permits longitudinal positional adjustment of the at least one longitudinally extending member with respect to at least one of the first and second armor termination members. During assembly of the connector, this may allow the distance between the first and second armor termination member to be set according to the requirements of the two connector parts properly mating to form the electrical connection and provide the watertight seal. Thereafter, the adjustment device may be used to position the at least one longitudinally extending member so that the at least one longitudinally extending member holds the first and second armor termination at that distance.

For example, the at least one longitudinally extending member may be a tie bar with threaded portions at each end. The tie bar may extend through an aperture in one of the armor termination members and a corresponding aperture in the other armor termination member and be fixable thereto by a pair of nuts on the threaded portions at each end. This provides that the position of the tie bar with respect to the armor termination members may be adjusted during installation. Thus, the length of the portion of the tie bar that extends between the armor termination may be determined as required by the mating of the connector parts, and does not interfere with that mating. Other types of adjustment device may also achieve this effect.

This adjustability provides that the connector may have high tolerance to variations in the distance between the armor termination members.

In one embodiment, the first and second connector parts terminate a first and second cable, respectively. The first and second armor termination members are connected to the armor of the first and second cables, respectively. The watertight seal provided by the connector part housings is mechanically isolated from the armor of the cables. In one embodiment, the cables are of the type in which armor of the cable extends around the electrical cores in the cable.

Alternatively, the first connector part may terminate a first cable, and the second connector part may be attached to a bulkhead. In this case, the first armor termination member is connected to the armor of the first cable and the second armor termination is provided by the bulkhead. In this arrangement, the connector part housings are mechanically isolated from the armor of the cable, and stresses are transferred to the bulkhead via the at least one longitudinally extending member.

Either of these arrangements provides that any stresses in the cables that may cause strain in the cable armor and the at least one longitudinally extending member are not transferred to the watertight seal thereby increasing the reliability and lifetime of the connector.

The at least one longitudinally extending member may be connected to the first and second armor termination members so as to be capable of transmitting stresses between the armor termination members. Such stresses, which may be applied to the armor termination members during installation and in use (e.g., by first and second cables or by a cable and a bulkhead, may thus not be passed to the first and second connector part housings or the seal between the connector part housings. The stresses may be longitudinal compressive stress, longitudinal tensile stress, and/or torsional stress.

A plurality of longitudinally extending members may be provided. For example, such members may be provided at circumferential spacings around the connector part housings.

In one embodiment, when the first and second connector parts are mated, an enclosure is formed within the watertight seal. The outside of the seal may be subject to ambient conditions, such as ambient water (e.g., sea water), while the seal separates the enclosure from ambient conditions. The enclosure may simply contain air, or the enclosure may be filled with a fluid medium such as oil or gel. The enclosure may have a pressure balancer to balance the pressure in the enclosure with the pressure external to the enclosure. This prevents a large pressure difference between the inside of the watertight seal and the outside when the connector is placed on the sea bed. This provides that the integrity of the watertight seal is not compromised when the connector is on the sea bed. Alternatively, the enclosure may be non-pressure compensated. In this case, the sealing arrangement and the housing shall withstand the water depth pressure, which is likely to be small for offshore wind farms because offshore wind farms are generally located in shallow water (e.g., less than 100 m).

The connector disclosed herein may be used cable to cable or cable to bulkhead and may be used in various offshore renewable energy systems. The connector may, for example, be used to provide a system for testing energy generators. In one embodiment, the connector may be used in the method and systems according to the first, second and third aspects of the present embodiments.

In one embodiment, the longitudinally extending members are made of a metal (e.g., steel).

In one embodiment, the watertight housing is made of a thermoplastic material.

In one embodiment, the connector is a dry mate connector. The offshore electrical plant may be a renewable energy generator or an electrical sub-station and may be an offshore wind turbine generator.

DETAILED DESCRIPTION

FIGS. 1 to 4 show one embodiment of a method for connecting an offshore wind turbine generator to a cable. The method shown is specifically for a support structure that is located on a sea bed, although the method is applicable to other support structures (e.g., support structures that protrude into the sea bed or support structures that float).

Figure 1:
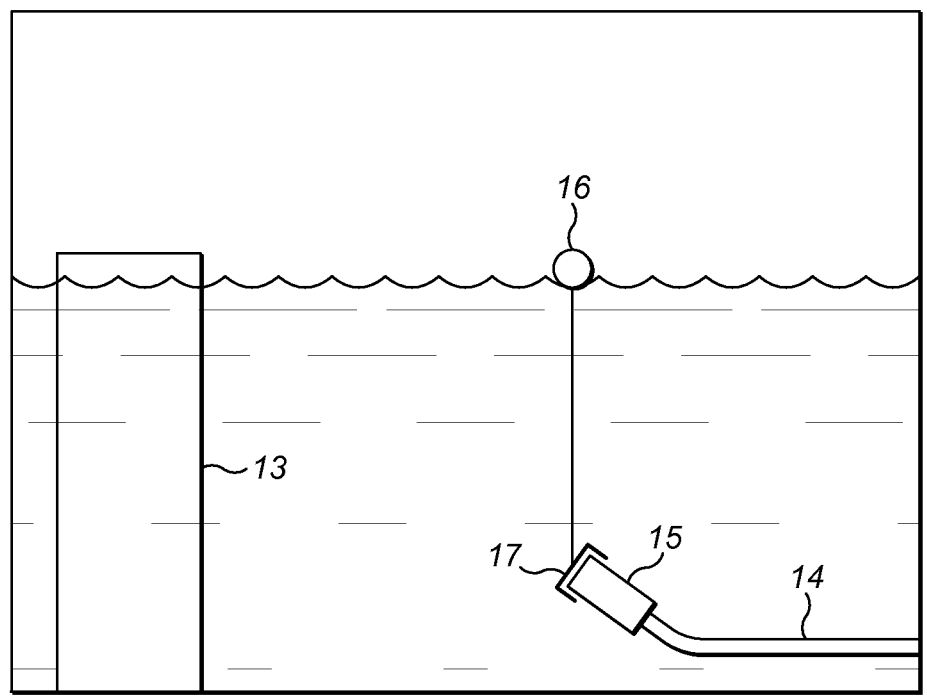
FIG. 1 shows the first act in one embodiment of a method for connecting an offshore electrical plant to a cable.

As illustrated by FIG. 1, initially, the support structure 13 of the wind turbine generator 11 is installed, and a cable 14 is laid. The cable 14 is pre-terminated at one end with a connector part 15 for connection to another connector part and attached to a buoy 16. The buoy 16 allows the end of the inter-array cable to be easily located and lifted to surface when required. The connector part 15 is sealed with a cap 17 to protect electrical contacts of the connector part 15 from the environment whilst the connector part 15 is temporarily placed on the sea bed. Alternatively, the cable 14, terminated with the connector part 15 (e.g., connector half), may not be pre-deployed but rather may be connected to another connector half before being deployed.

Figure 2:
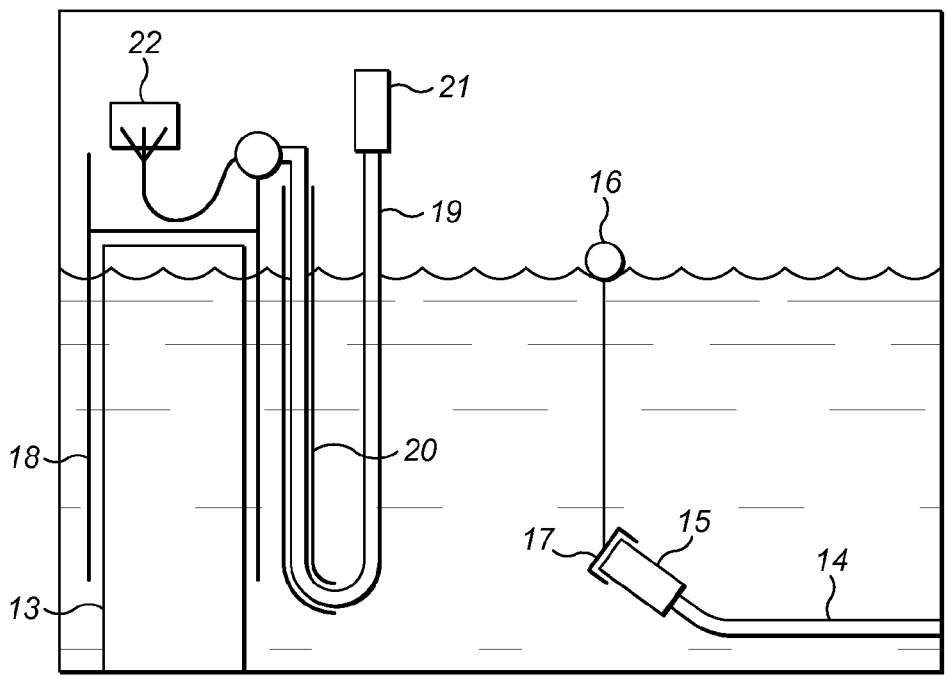
FIG. 2 shows the second act in one embodiment of a method for connecting an offshore electrical plant to a cable.

Next, as illustrated by FIG. 2, a transition piece 18 is installed on the support structure 13, to which a transition cable 19 is attached. Alternatively, the transition piece 18 with the transition cable may be installed to the support structure 13 prior to the deployment of the inter-array cable (e.g., the sequence of events shown in FIG. 1 and FIG. 2 may be different to that shown).

In FIG. 2, the transition cable is illustrated as being attached via a J-tube 20 welded to the transition piece 18, although the J-tube is not essential and the transition cable 19 may be attached in any other way. For example, the support structure 13 may be of such a design that a transition piece 18 is not required, and the transition cable may be attached directly to the support structure 13. The transition cable 19 is pre-terminated at one end with a connector part 21 that is mateable with the connector part 15 provided on the cable 14. The connector part 21 on the transition cable 19 may be considered to be a first connector part, and the connector part 15 on the cable 14 may be considered to be a second connector part. The transition cable 19 is also pre-connected to a switchgear, a junction box, or a connection system 22 (e.g., another pair of connector parts) at the other end, which allows a quick connection to the wind turbine generator 11 once installed.

Figure 2A:
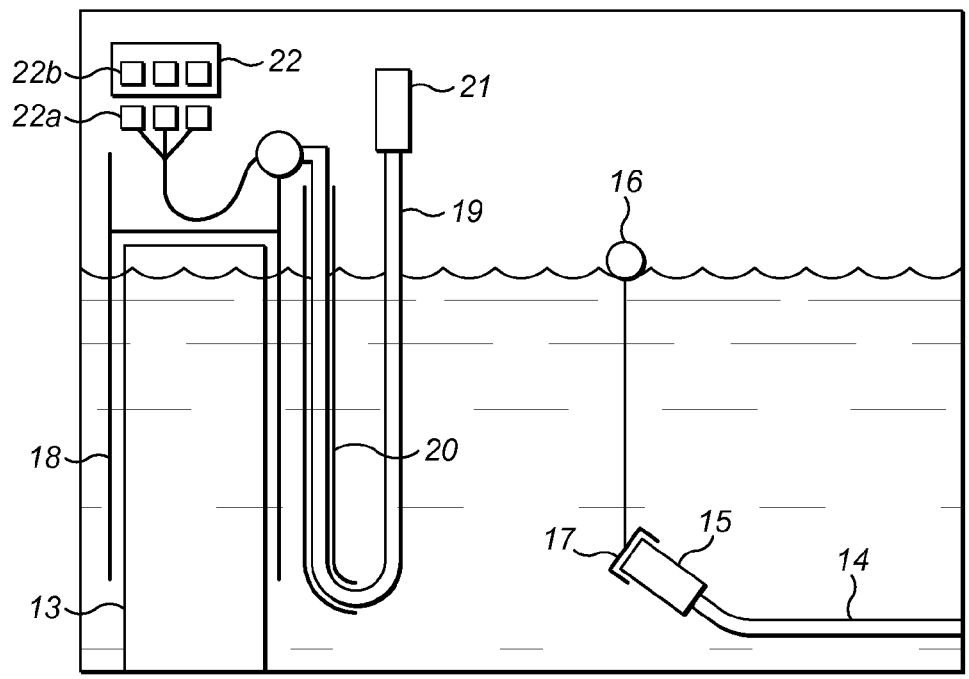
FIG. 2a shows an alternative arrangement to the arrangement shown in FIG. 2.

Alternatively, as shown in FIG. 2a, the transition cable 19 is pre-terminated with a plurality of connector parts 22a, each terminating a high voltage conductive core of the cable. The switchgear, the junction box, or the connection system 22 is provided with a plurality of second connector parts 22b that correspond and are mateable with the plurality of connector parts 22a on the transition cable. The switchgear, the junction box, or the connection system 22 may be connectable to the wind turbine generator by further cabling and connector parts or hard wired thereto.

The first connector part 21 on the transition cable is held above the surface of the water before being connected to the second connector part 15 on the pre-laid cable 14. Alternatively, the connector part 21 on the transition cable may be capped and temporarily placed on the sea bed and retrieved when the connection is to be made.

Figure 3:
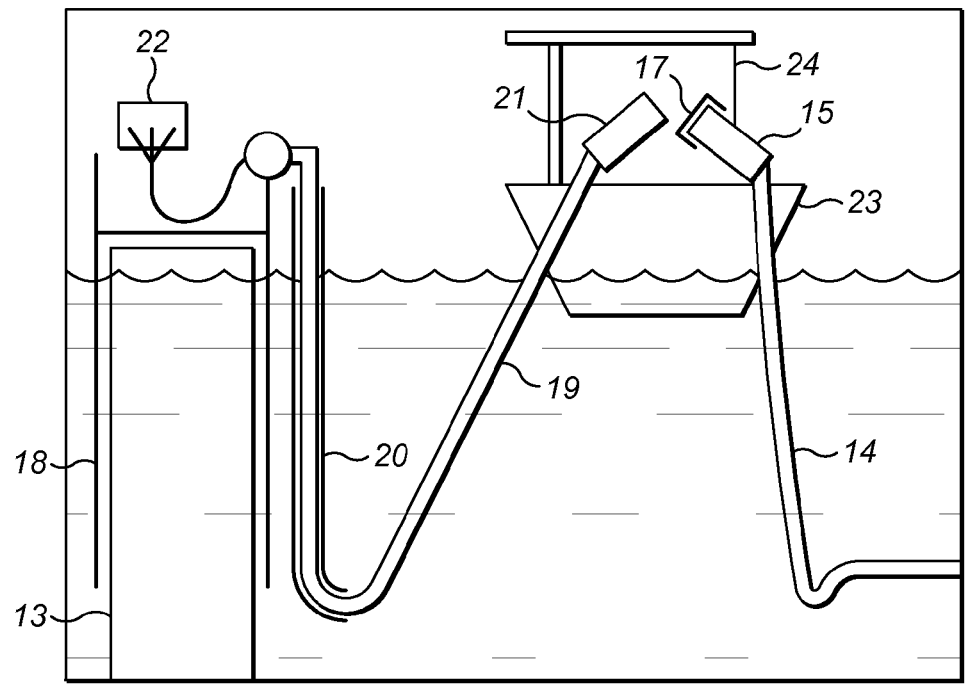
FIG. 3 shows the third act in one embodiment of a method for connecting an offshore electrical plant to a cable.

Next (as shown in FIG. 3), the first connector part 21 is collected from the transition piece 18 or support structure 13 onto the deck of a vessel 23, and the second connector part 15 on the cable 14 is lifted to the surface onto the deck of the vessel 23 by a winch 24 where the cap 17 is removed and the second connector part 15 on the cable 14 is mated with the first connector part 21 attached to the transition cable 19. Additionally, while on the deck of a vessel 23, testing may be carried out prior to mating of the connectors.

Optionally, the wind turbine generator may be installed on the support structure 13 before testing and connecting the two connector parts 15, 21, so as to allow testing of the full electrical installation.

Figure 4:
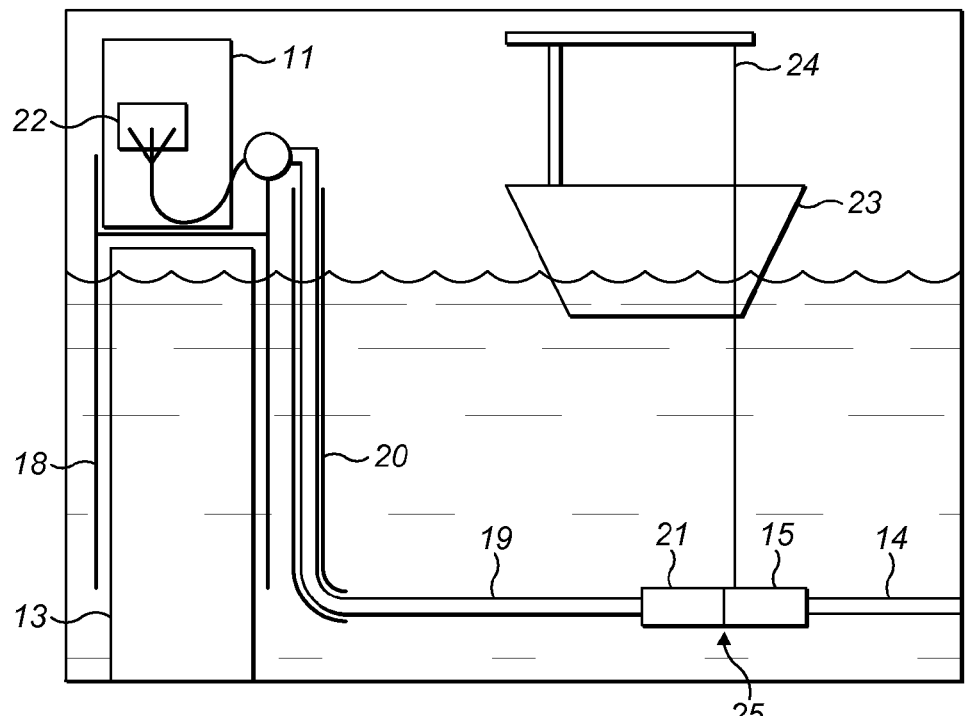
FIG. 4 shows the fourth act in one embodiment of a method for connecting an offshore electrical plant to a cable.

As shown in FIG. 4, the wind turbine generator 11 is installed on the support structure 13. The connector 25, made up of the two connector parts 15, 21, is winched out from the deck of the vessel 23 to the sea bed where the connection 25 will be located during normal operation.

Figure 5:
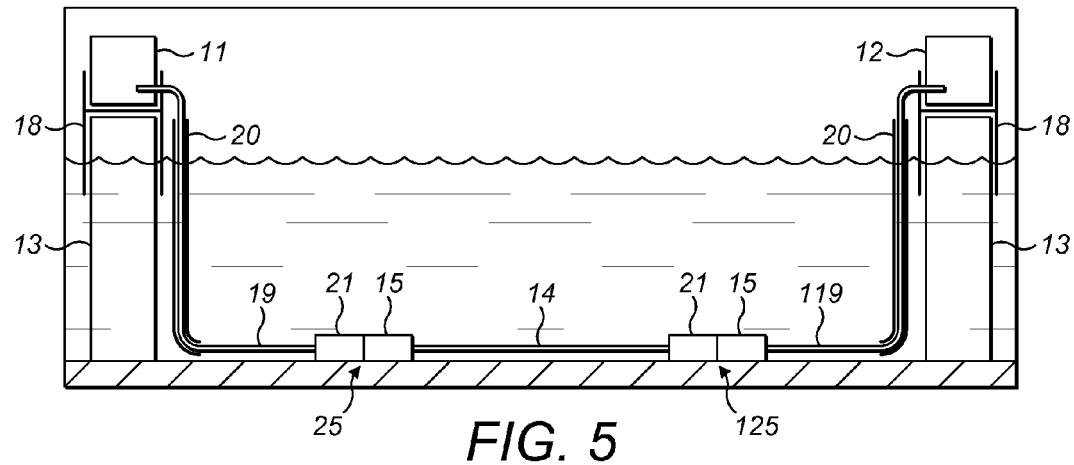
FIG. 5 shows a first embodiment of a system.

As shown in FIG. 5, the cable 14 may be an inter-array cable that is connected or connectable at the other end to a second transition cable 119, by a second connector 125. The inter-array cable 14 extends between the first transition cable 19, which is connected or connectable to a wind turbine generator 11, and a second transition cable 119, which is connected or connectable to a second electrical plant 12. The second electrical plant 12 may be a wind turbine generator or an electrical sub-station. The inter-array cable 14 is connected to the first transition cable 19 by the first connector 25, and the inter-array cable 14 is connected to the second transition cable 119 by a second connector 125. The first connector 25 includes the first connector part 21 terminating an end of the first transition cable 19 and the second connector part 15 terminating one end of the inter-array cable 14. The second connector 125 includes a first connector part 21 terminating an end of the second transition cable 119 and a second connector part 15 terminating the end of the inter-array cable 14 opposite the end terminated by the second connector part of the first connector 25.

Figure 6:
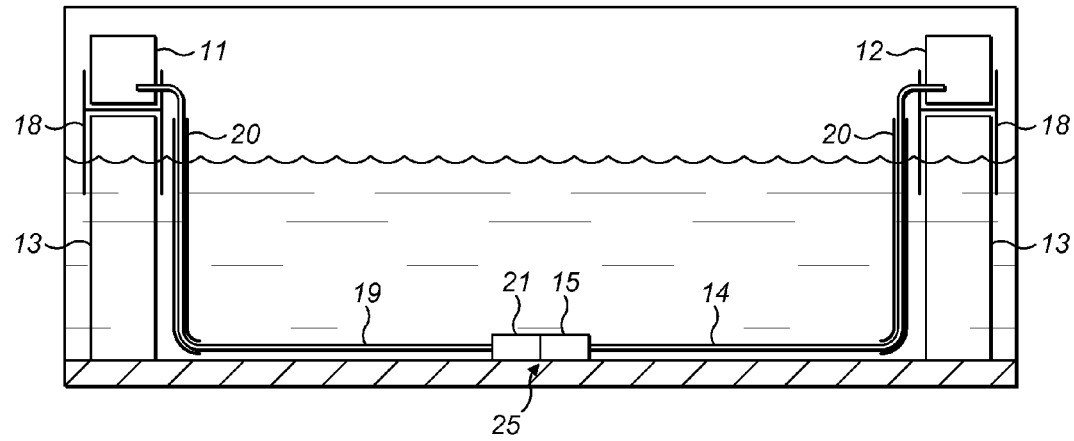
FIG. 6 shows a second embodiment of the system.

Alternatively, as shown in FIG. 6, the inter-array cable 14 may be a second transition cable that is connected or connectable to a second electrical plant 12 at the other end.

Figure 7:
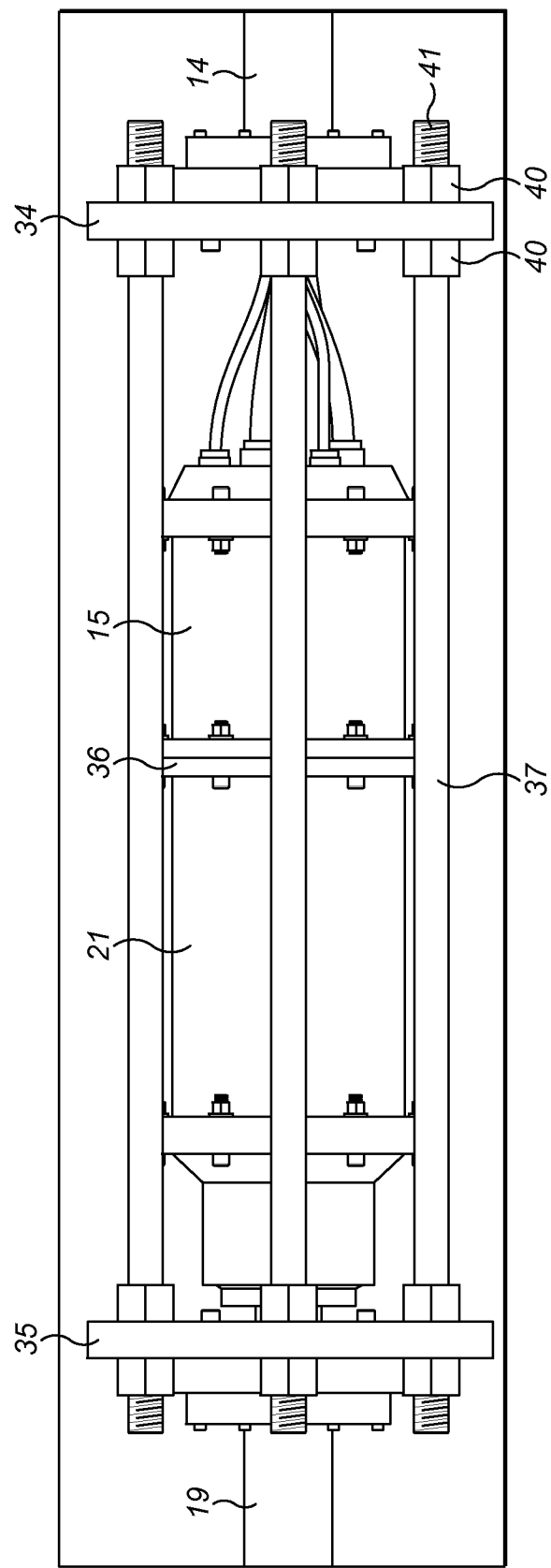
FIG. 7 shows one embodiment of a connector.
Figure 8:
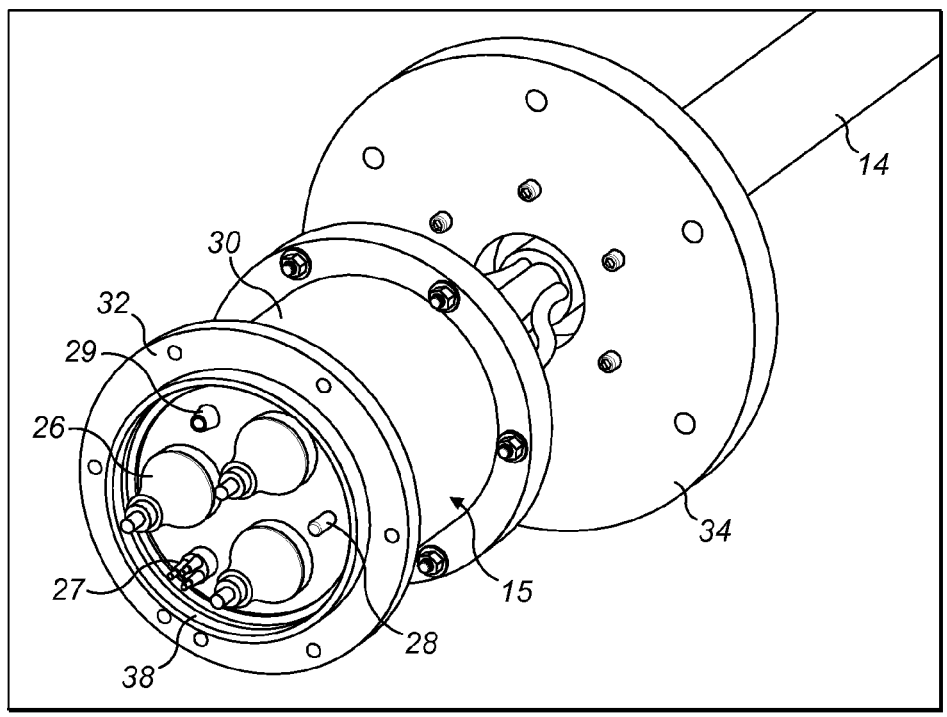
FIG. 8 shows one embodiment of a plug connector part.
Figure 9:
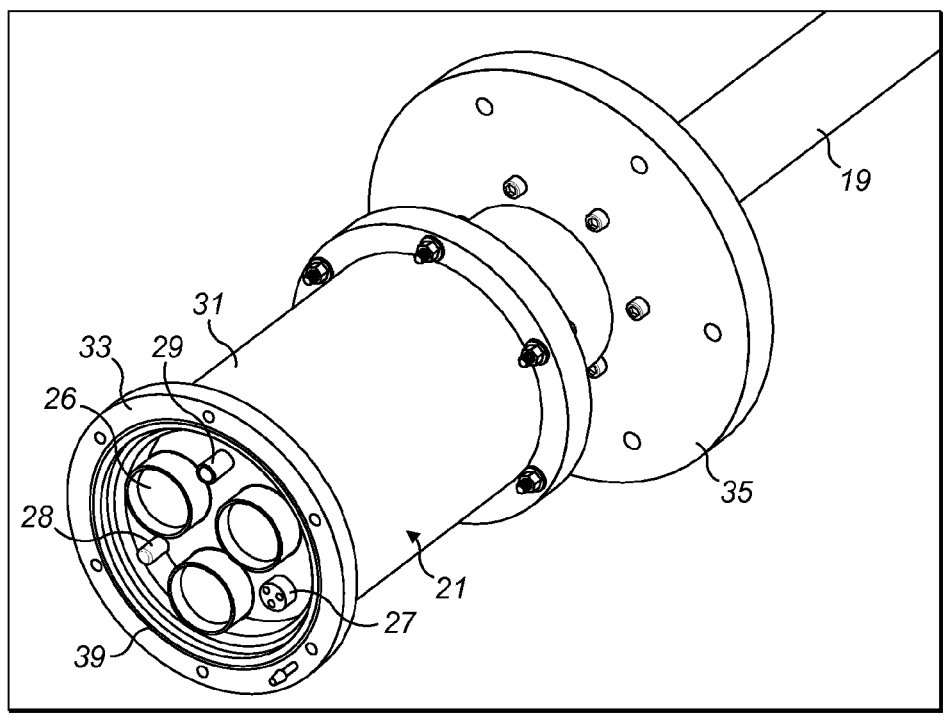
FIG. 9 shows one embodiment of a receptacle connector part.
Figure 10:
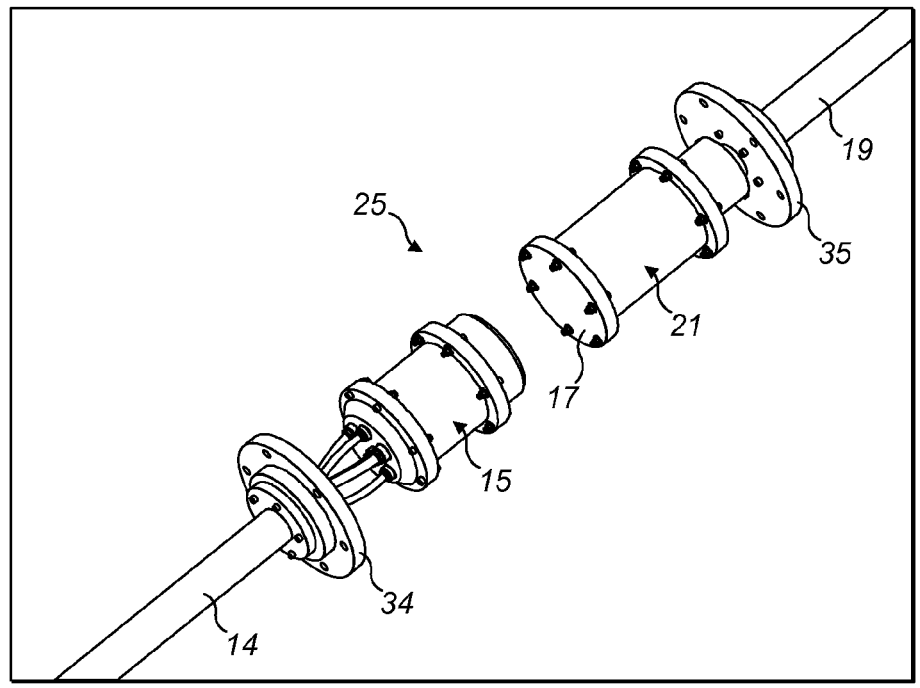
FIG. 10 shows the first act in a connection sequence of one embodiment of the connector.

The first electrical connector 25 includes the first and a second connector part 21,15, which terminate a first and a second cable 19,14, respectively (see FIGS. 7, 8 and 9). Specifically, in the above-described method, the first and second connector parts terminate the transition cable 19 and the cable 14, respectively. As shown in FIGS. 8 and 9, each connector part 15, 21 includes three high voltage electrical contacts 26, a low voltage triad contact 27, an earth pin 28 and a fiber optic contact 29, although the contacts present in the connector parts 15, 21 will depend on the application of the connector. All the cables cores, including the three high voltage cable cores, are terminated within a single water tight housing. The contacts of each connector part 15, 21 are housed with a connector housing part 30, 31. Each connector housing part 30, 31 has a front portion for connection to the other connector housing part of the connector 25. The internals of the first and second cables 19,14 are fed into a rear portion of the first and second connector part housings 31, 30. To create the connector 25, the two connector parts 15, 21 are connected together to create a watertight seal 36 around electrical connections made in the connector. The seal is formed between a protruding circumferential flange or ridge 38 on one connector part and a corresponding circumferential groove 39 on the other connector part. The groove 39 is lined with an elastomeric or rubber seal (not shown). When the two parts are connected, the flange 38 is located within the groove 39 and forms a water tight seal by engagement with the rubber seal in the groove 39. The connector parts are held together by bolting flanges 32, 33 provided on the front portion of each of the connector parts 15, 21.

The electrical connector 25 also includes first and second armor termination plates 35, 34 or armor termination members that terminate steel armor provided in the cables 19, 14. The armor termination plates 34, 35 are located longitudinally rearwardly of the connector part housings 15, 21. Six longitudinally extending members 37, or tie bars, are located radially outwardly of the connector parts 15, 21 and extend between the first and second armor termination plates 35, 34. The tie bars 37 are bolted to the armor termination plates 34, 35 to form a cage around the two connector parts 15, 21.

The tie bars 37 have a threaded portion 41 at each end to which nuts 40 engage to secure the tie bars 37 to the armor termination plates 34, 35. At each end of each tie bar, a pair of nuts 40 are provided, one on either side of the armor termination plate (e.g., four nuts are provided on each tie bar). Each pair of nuts engages the threaded portion at one end and may be screwed so as grip or clamp the armor termination plate into position relative to the tie bar. This provides that longitudinal positional adjustment of the tie bar relative to the armor termination plate may be provided. This adjustability is achieved by each pair of nuts 40 being engageable to the tie bar at various positions along the threaded portion 41 of the tie bars 37. Although six tie bars are used in the embodiment shown, any number of tie bars may be used as appropriate for the application. The tie bars 37 are secured between the two armor termination plates 34, 35 to provide mechanical strength to the connector 25 and provide mechanical continuity in compression, tension, and torsion between the armor of the two cables 14, 19 being connected. The transmission path for stresses applied to the cables 14, 19 during installation and use is through the armor termination plates 34, 35 through the ties bars 37 and to the armor of the other cable. Thus stresses bypass the two connector parts 15, 21 bolted together. This arrangement isolates the watertight seal 36 from any relative movement or strain of the tie bars 37 and any mechanical loads experienced by the cables during installation and use. The tie bars are effectively movable relative to the connector parts of the first and second connectors.

As shown in FIGS. 8 and 9, the internal wires leading into the rear of the connector part housings 30, 31 may be individually sheathed or all covered in an overall sheath to protect the internal wires from the ambient environment. In either alternative, the internal wires do not transmit mechanical forces from the cables 14, 19 to the two connector parts 15, 21.

FIGS. 10 to 13 show a connection sequence of the above described connector 25. As shown in FIG. 8, a first connector part 21 and a second connector part 15 are provided. Each of the connector parts is sealed by cap 17 bolted to the flange 33, 32 on the front portion of each of the connector part housings 31, 30. Each connector part 15, 21 terminates the internal wires of the cable 14, 19, and the armor termination plate 34, 35 terminates the steel armor provided in the cables.

Figure 11:
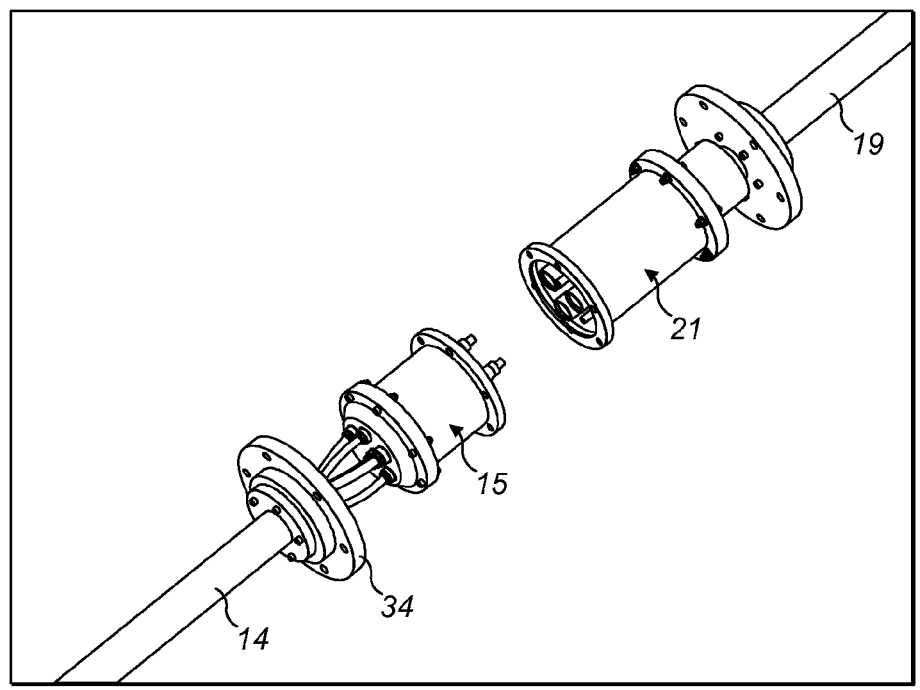
FIG. 11 shows the second act in a connection sequence of one embodiment of the connector.

In the next act, shown in FIG. 11, the caps 17 are removed from the connection portion of each of the connector parts 15, 21, and the connector parts are offered up.

Figure 12:
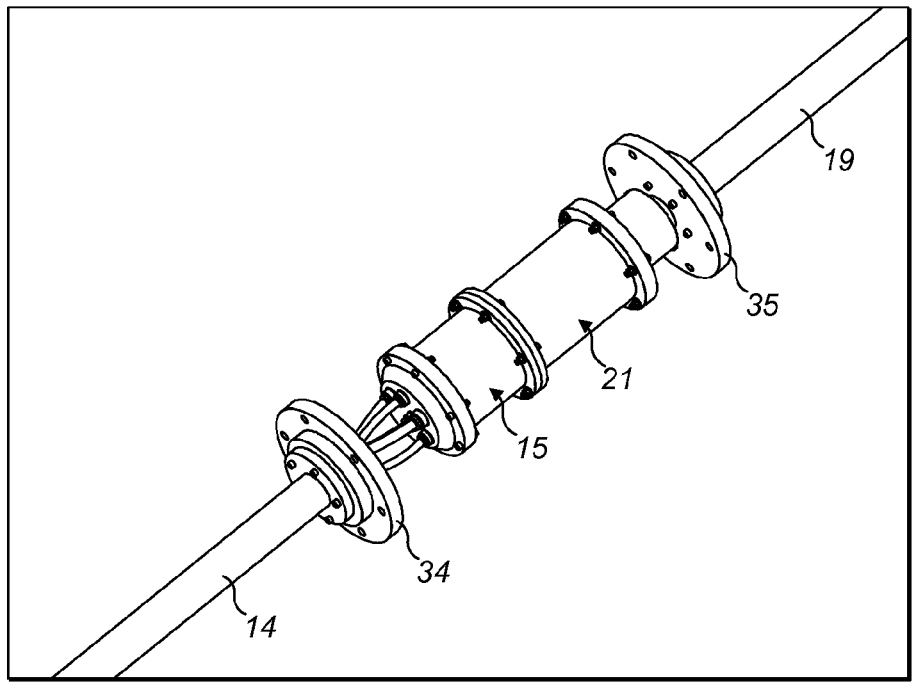
FIG. 12 shows the third act in a connection sequence of one embodiment of the connector.
Figure 13:
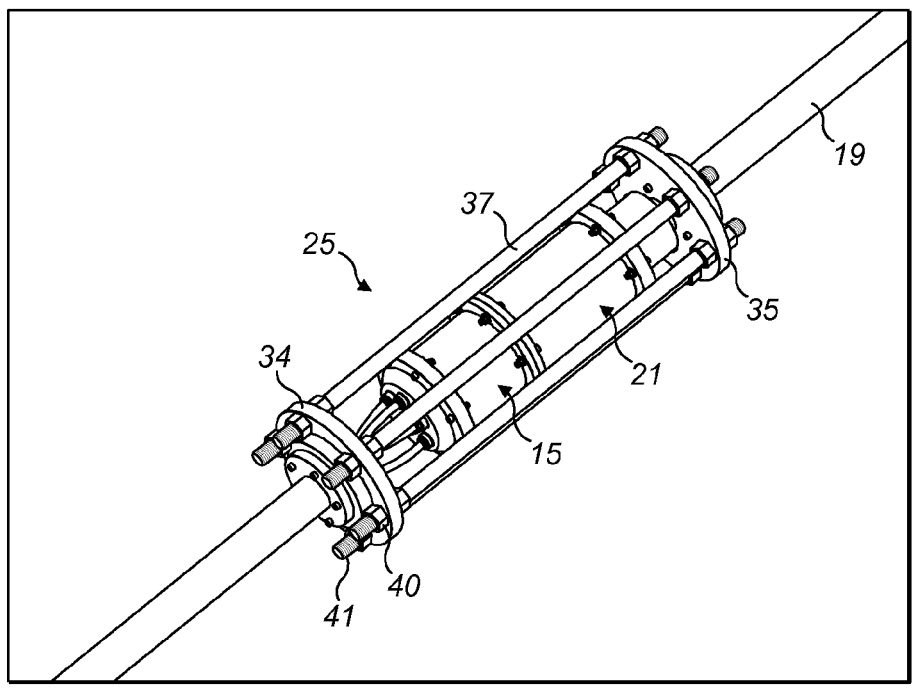
FIG. 13 shows the final act in a connection sequence of one embodiment of the connector.

As shown in FIG. 12, the two connector parts 15, 21 are then secured together by bolting together the flanges 32, 33 provided on each of the front end of the connector parts. The tie bars 37 are installed such that the tie bars 37 extend between the armor termination plates 34, 35 and are bolted to the armor termination plate (see FIG. 13).

The enclosure or chamber formed within the two connector housings may be pressure compensated.

The invention claimed is:

1. A method for electrically connecting an offshore first electrical plant to a second electrical plant, the offshore first electrical plant being an offshore wind turbine generator, the method comprising:
    providing a transition cable terminated at one end with a first connector part, the transition cable being connected or connectable at the other end to the offshore wind turbine generator above a water surface;
    providing a cable terminated at one end with a second connector part and connected or connectable at the other end to the second electrical plant, the second connector part being adapted to mate with the first connector part to form a connector;
    securing the transition cable to a structure that supports the offshore wind turbine generator so that the transition cable extends from the other end, which is connected or connectable to the offshore wind turbine generator, towards a bottom of the sea and back up to the water surface to locate the first connector part above the water surface;
    lifting the second connector part from the bottom of the sea to the water surface or providing the second connector part above the water surface;
    mating the second connector part with the first connector part above the water surface, wherein the first connector part and the second connector part are dry mateable.

2. The method of claim 1, further comprising lowering the mated first connector part and second connector part to the bottom of the sea.

3. The method of claim 1, further comprising:
    installing the first connector part to the transition cable onshore; and
    installing the second connector part to the cable onshore.

4. The method of claim 1, further comprising providing, at the other end of the transition cable, which is connectable to the offshore wind turbine generator, a connector part for connection to another connector part that is connected or connectable to the offshore wind turbine generator.

5. The method of claim 4, further comprising providing the transition cable with a plurality of connector parts for connection to a plurality of connector parts that are connected or connectable to the offshore wind turbine generator.

6. The method of claim 1, wherein the cable terminated by the second connector part is an inter-array cable, and
    wherein the method further comprises:
        providing the inter-array cable, at an end remote from the second connector part, with another second connector part; and
        providing another transition cable, the other transition cable being connected or connectable to the second electrical plant and being terminated with another first connector part, the other first connector part being adapted to mate with the other second connector part at the remote end of the inter-array cable to form a second connector.

7. The method of claim 1, wherein the cable terminated by the second connector part is a second transition cable, the second transition cable being connected or connectable to the second electrical plant.

8. A system for electrically connecting an offshore first electrical plant to a second electrical plant, the offshore first electrical plant being an offshore wind turbine generator, the system comprising:
    a transition cable terminated at one end with a first connector part, the transition cable being connected or connectable at the other end to the offshore wind turbine generator above a water surface; and a cable terminated at one end with a second connector part and connected or connectable at the other end to the second electrical plant, the second connector part being adapted to mate with the first connector part to form a connector, wherein the transition cable is installed on a structure that supports the offshore wind turbine generator and extends from the other end, which is connected or connectable to the offshore first electrical plant, towards a bottom of the sea, wherein the transition cable is adapted to extend back up to the water surface to locate the first connector part above the water surface for mating the second connector part with the first connector part above the water surface, and wherein the first connector part and the second connector part are dry mateable.

9. The system of claim 8, wherein the first connector part is detachable from the structure and moveable away from the structure to a position where the first connector part is mateable with the second connector part.

10. The system of claim 8, wherein the other end of the transition cable, which is connectable to the offshore wind turbine generator, is provided with a connector part for connection to another connector part provided on the offshore wind turbine generator.

11. The system of claim 8, wherein the cable terminated by the second connector part is an inter-array cable, and wherein the inter-array cable is terminated, at an end remote from the second connector part, with another second connector part, the inter-array cable being connectable to another transition cable, the other transition cable being connected or connectable to the second electrical plant and being terminated with another first connector part adapted to mate with the other second connector part at the remote end of the inter-array cable to form a second connector.

12. The system of claim 8, wherein the second connector part terminates another transition cable, and wherein the other transition cable is connected or connectable to the second electrical plant.

13. A connector for use underwater and for connecting an underwater cable to an offshore electrical plant, the connector comprising:

a first connector part and a second connector part, wherein each connector part of the first connector part and the second connector part comprises:
at least one electrical contact; and
a connector part housing having a front portion for engagement with another connector part housing;
at least one longitudinally extending member located radially outwardly of the connector part housings;
a first armor termination member located longitudinally rearwardly of the front portion of the first connector part; and
a second armor termination member located longitudinally rearwardly of the front portion of the second connector part, wherein when the first connector part and the second connector part are mated, the at least one electrical contact of one of the first connector part and the second connector part comes into electrical contact with a respective at least one electrical contact of the other of the first connector part and the second connector part to form an electrical connection, wherein when the first connector part and the second connector part are mated, the connector part housings come into contact to provide a watertight seal around the electrical connection to isolate the electrical connection from the ambient environment of the connector, wherein when the connector is assembled, the at least one longitudinally extending member extends between the first armor termination member and the second armor termination member, and wherein, when installed, the at least one longitudinally extending member is rigidly connected to the first armor termination member and the second armor termination member.

14. The connector of claim 13, wherein the watertight seal is isolated from strain of the at least one longitudinally extending member.

15. The connector of claim 13, wherein the at least one longitudinally extending member is longitudinally movable relative to the front portions of the connector part housings.

16. The connector of claim 13, further comprising an adjustment device that permits longitudinal positional adjustment of the at least one longitudinally extending member with respect to at least one of the first armor termination member and the second armor termination member.

17. The connector of claim 13, wherein the first connector part and the second connector part terminate a first cable and a second cable, respectively, and wherein the first armor termination member and the second armor termination member are connected to armor of the first cable and the second cable, respectively, and wherein the watertight seal provided by the connector part housings is mechanically isolated from the armor of the cables.

18. The connector of claim 13, wherein when the first connector part and the second connector part are mated, an enclosure is formed within the watertight seal, the enclosure having a pressure balancing device to balance a pressure in the enclosure with a pressure external to the enclosure.

19. The connector of claim 13, wherein the connector is a dry mate connector.

20. The connector of claim 13, wherein the offshore electrical plant is an offshore wind turbine generator.

21. The method of claim 1, wherein the connector comprises:

the first connector part and the second connector part, wherein each connector part of the first connector part and the second connector part comprises:
at least one electrical contact; and
a connector part housing having a front portion for engagement with another connector part housing;
at least one longitudinally extending member located radially outwardly of the connector part housings;
a first armor termination member located longitudinally rearwardly of the front portion of the first connector part; and
a second armor termination member located longitudinally rearwardly of the front portion of the second connector part, wherein when the first connector part and the second connector part are mated, the at least one electrical contact of one of the first connector part and the second connector part comes into electrical contact with a respective at least one electrical contact of the other of the first connector part and the second connector part to form an electrical connection, wherein when the first connector part and the second connector part are mated, the connector part housings come into contact to provide a watertight seal around the electrical connection to isolate the electrical connection from the ambient environment of the connector, wherein when the connector is assembled, the at least one longitudinally extending member extends between the first armor termination member and the second armor termination member, and wherein, when installed, the at least one longitudinally extending member is rigidly connected to the first armor termination member and the second armor termination member.

22. The system of claim 8, wherein the connector comprises:

the first connector part and the second connector part, wherein each connector part of the first connector part and the second connector part comprises:

at least one electrical contact; and a connector part housing having a front portion for engagement with another connector part housing;

at least one longitudinally extending member located radially outwardly of the connector part housings;

a first armor termination member located longitudinally rearwardly of the front portion of the first connector part; and a second armor termination member located longitudinally rearwardly of the front portion of the second connector part, wherein when the first connector part and the second connector part are mated, the at least one electrical contact of one of the first connector part and the second connector part comes into electrical contact with a respective at least one electrical contact of the other of the first connector part and the second connector part to form an electrical connection, wherein when the first connector part and the second connector part are mated, the connector part housings come into contact to provide a watertight seal around the electrical connection to isolate the electrical connection from the ambient environment of the connector, wherein when the connector is assembled, the at least one longitudinally extending member extends between the first armor termination member and the second armor termination member, and wherein, when installed, the at least one longitudinally extending member is rigidly connected to the first armor termination member and the second armor termination member.

\* \* \* \* \*